June 4, 1940.   P. C. GOLDMARK   2,203,352
METHOD AND APPARATUS FOR PRODUCING ECHO EFFECTS
Filed Dec. 18, 1936   3 Sheets-Sheet 1

INVENTOR.
Peter C. Goldmark
BY
Watson, Bristol, Johnson & Leavenworth
ATTORNEYS.

June 4, 1940. P. C. GOLDMARK 2,203,352
METHOD AND APPARATUS FOR PRODUCING ECHO EFFECTS
Filed Dec. 18, 1936   3 Sheets-Sheet 2

INVENTOR.
Peter C. Goldmark
BY Watson, Bristol, Johnson & Leavenworth
ATTORNEYS.

June 4, 1940.                P. C. GOLDMARK                2,203,352
METHOD AND APPARATUS FOR PRODUCING ECHO EFFECTS
Filed Dec. 18, 1936                3 Sheets-Sheet 3

INVENTOR.
Peter C. Goldmark
BY Watson, Bristol, Johnson & Leavenworth
ATTORNEYS.

Patented June 4, 1940

2,203,352

UNITED STATES PATENT OFFICE 2,203,352

METHOD AND APPARATUS FOR PRODUCING ECHO EFFECTS

Peter C. Goldmark, New York, N. Y., assignor to Markia Corporation, New York, N. Y., a corporation of New York Application December 18, 1936, Serial No. 116,601

27 Claims. (Cl. 179—1)

This invention relates to a method and apparatus for producing echo and reverberation effects, and particularly to a method and apparatus for producing echo and reverberation effects in connection with radio broadcasting.

The invention has for its object generally an improved construction and arrangement of parts in transmitting systems for radio sound broadcasts whereby substantially any desired echo or reverberation effect may be produced without the use of an echo chamber or studio especially constructed for the purpose.

More specifically, the invention has for its object the provision of a system for repeating any given sound effect one or more times after an original sound effect at desired intervals of time, the total sound effects being employed for jointly modulating the carrier being broadcast.

Another object is to provide a convenient photoelectrically actuated system for recording and repeating sound effects at desired intervals after the original sound effect in order to simulate a desired echo or reverberation effect.

Another object is to provide a method and means for making a transient or fugitive record image of a sound effect that may be used to actuate suitable photoelectric devices employed for repeating the sound in order to produce an echo effect.

Still another object is to provide suitable means for making and moving a fluorescent record image of original sound effects of a character adapted to be employed at the proper instant to actuate photoelectric devices to produce secondary currents that may be employed jointly with that from the microphone to modulate the carrier being broadcast so as to simulate echoes or reverberation.

Other objects of the invention will in part be obvious and will in part appear hereinafter.

The invention accordingly comprises the several steps and the relation of one or more of such steps with respect to each of the others, and the apparatus embodying features of construction, combinations of elements and arrangement of parts which are adapted to effect such steps, all as exemplified in the following detailed disclosure, and the scope of the invention will be indicated in the claims.

For a fuller understanding of the nature and objects of the invention, reference should be had to the following detailed description taken in connection with the accompanying drawings, in which.

Figure 1:
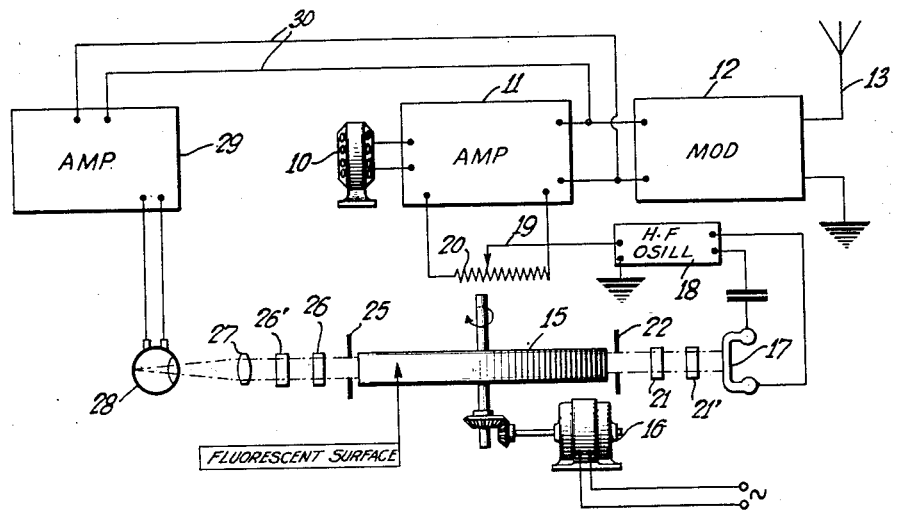
Fig. 1 is a view, mainly diagrammatic, showing an arrangement of apparatus for radio broadcasting together with echo producing apparatus provided in accordance with the invention.

In the art of broadcasting sound effects by means of radio, it is now common practice to provide specially constructed studios in which the performers produce the desired sound effects. Specially constructed walls are invariably employed in order to achieve desired damping effects and to avoid unwanted reflections of sound waves. Where echoes and other effects requiring reflections of sound waves and the repetition of sound are desired, specially constructed chambers are now commonly employed. Such chambers occupy considerable space which might profitably be put to other uses, and the reverberation characteristics thereof can be altered only to a limited extent, and that at the cost of refacing walls, floor and ceiling, or placing hangings and carpets thereover, etc. Also, such chambers are of course not readily portable.

The present invention is designed to overcome these difficulties. In accordance with the invention a transient or fugitive record of the original sound is made, from which repeat effects may be obtained at desired instants by generating a secondary current at suitable instants with reference to the original sound generated or microphone current. Such secondary current is employed for modulating the carrier jointly with that produced by the original sound effect. The generation of the secondary modulating current is advantageously achieved photoelectrically. The sound record that is provided is accordingly such as to be capable of optical reproduction.

The record image of the original sound effect is preferably a transient or fugitive one, since by this means the studio apparatus intended for commercial broadcasting may be made relatively compact and simple and is adapted for continuous use. A convenient arrangement attaining these ends employs a moving surface containing fluorescent material on which the original sound effect may be recorded by means of a suitable sound-controlled source of light which is capable of producing fluorescence, for example, an ultra violet source of light. The transient fluorescent image thus produced may be termed a "ghost"

image and represents the original sound effects. To get an echo effect, this image is moved past a photoelectric pick-up device at a desired interval after the original sound effect occurred and a secondary current is produced which is employed along with that had from the microphone to achieve the echo or repeat-sound effect desired in modulating the carrier being broadcast.

While the record image on the fluorescent surface is transient and will disappear in time, it is preferred to wipe off the image by convenient means so that the fluorescent surface is thereafter ready for reuse and is adapted to receive another sound record. The fluorescent surface, in consequence, may be provided on a continuously rotating body, the ultra violet source of light for producing the image upon the fluorescent surface being arranged at one point, the photoelectric pick-up means being arranged at another point which represents a desired interval of time that is to elapse between the original sound and the repeat effect, the fluorescent image erasing means being arranged at a third point. Any suitable image erasing means may be employed, such as a source of infra-red rays disposed at a point that is passed after the fluorescent surface has passed the photoelectric pick-up device.

Referring now to the drawings, and particularly to Fig. 1, 10 denotes a microphone in a place, such as a studio, where it will be affected by the original sound that is to be broadcast. This microphone is indicated as connected to an amplifying stage at 11, which in turn is connected to a modulating stage 12, the latter having connected to it the broadcasting antenna 13.

To provide a rotating support for the fluorescent surface which is to receive a record image of original sound in accordance with the invention, a horizontally disposed disk 15 is shown as provided with a relatively thick edge for carrying the fluorescent material. The disk is made to rotate at a desired speed by means of any convenient source of motive power, for example, an electric motor as shown at 16. The source of ultra violet light, which produces the image on the surface of the disk 15, may be any convenient source, for example, a mercury vapor quartz lamp 17. This lamp is shown as excited by means of a high frequency oscillator 18 which is connected through a conductor 19 and variable resistance 20 to the amplifier 11 so as to be under the influence of and controlled by the original sound-produced current.

The light from the lamp 17 is collected by a suitable optical system and focused on elements of the fluorescent surface, the balance of the surface or so much thereof as is necessary being screened from the ultra violet and other light sources by suitable means. In the optical system shown by way of example, an arrangement comprising cylindrical lenses 21 and 21' is employed which collect and focus the light upon a slit in a screen or mask 22. These elements of the optical system together with the lamp 17 are held in assembled relation by any convenient means, for example, an optical bench as shown at 23 that is arranged to hold the system adjacent the fluorescent surface at a desired point.

The pick-up apparatus is also mounted on convenient means, such as optical bench 24 which is disposed at another point adjacent the periphery of the disk 15 so as to pick up the image at a desired interval of time after the original sound effect. The optical system on bench 24 may be any convenient system and is here shown as comprising a screen or mask 25, lenses 26, 26', and spherical lens 27 bringing the image to a focus in a photoelectric cell 28. This latter, as shown in Fig. 1, is connected to an amplifying stage 29 that has connections 30 leading to the connections from the stage 11, whereby the pick-up device may impress its current along with that from the microphone 10 in order jointly to modulate the transmitting carrier.

The position of the optical bench 24 is preferably arranged to be accurately adjusted about the periphery of the disk 15 in order to pick up a desired image precisely at the proper instant. To this end, an adjusting means, such as screw 31, is provided on the bench which engages with a segment 32 stationarily disposed with respect to the disk.

The source of infra-red rays employed to erase or wipe off the ghost image is shown as provided by a housing 33 which has a window with a filter 34 that passes infra-red light, the window being disposed closely adjacent the fluorescent surface at a point passed subsequent to the pick-up device but prior to the lamp 17. The light source within the housing is advantageously an incandescent lamp whose radiation is rich in infra-red light, as shown at 35, and is supplied with current from a source of E. M. F. shown at 36.

The fluorescent material on the cylindrical surface of disk 15 may be provided in any convenient manner. As an example of a convenient way in which this may be done, the cylindrical surface of disk 15 is thinly coated with a suitable vehicle such as amylacetate and a thin layer of fluorescent material sprinkled or otherwise uniformly spread over and made adherent to the vehicle, which is thereafter dried to adapt it for use. The fluorescent agent or material is preferably of a character which retains its fluorescence, when once excited, for a relatively long period of time. Such agent or material may be one or a mixture of the following: Calcium fluoride, zinc sulphide, cadmium sulphide, etc.

The width of the slit in the mask or screen of the optical systems here employed, for example, that in mask 22, has been ascertained to have relatively precise dimensions in order to record separate images of the crests of the sound waves determined by the maximum frequency of the sound to be recorded together with the size and rate of revolution of the disk employed for receiving the record. These factors have a relation expressed in the following formula:

$$\pi d n = 2 w . f,$$

where $d$ is the diameter of the disk, $w$ the width of the slit which is to span one-half a wave length of maximum frequency, $f$ the maximum sound frequency, and $n$ the number of revolutions of the disk per second. Then, if the determining quantities have the following values: $d=6$ inches, $f=5000$ cycles, $n=1$, it is seen that $w$ is determined as follows:

$$w = \frac{\pi . d . n}{2f} = \frac{\pi \times 6 \times 1}{10000}$$

$$= .0019 \text{ inch}$$

Figure 2:
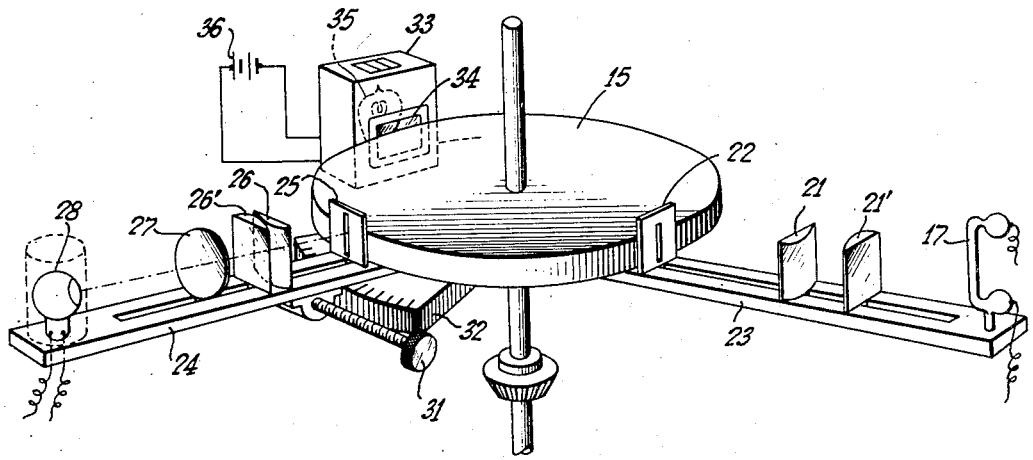
Fig. 2 is an enlarged view, mainly in perspective, showing the relation of essential parts of the echo producing apparatus shown in Fig. 1.
Figure 3:
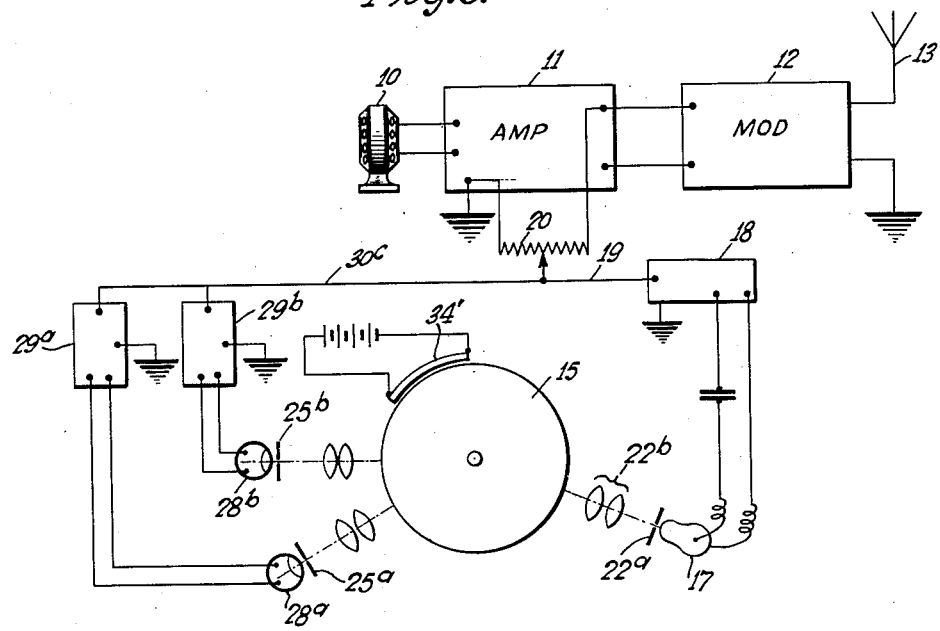
Fig. 3 is a diagrammatic view showing a modified arrangement of parts for producing an echo effect in accordance with the invention.
Figure 4:
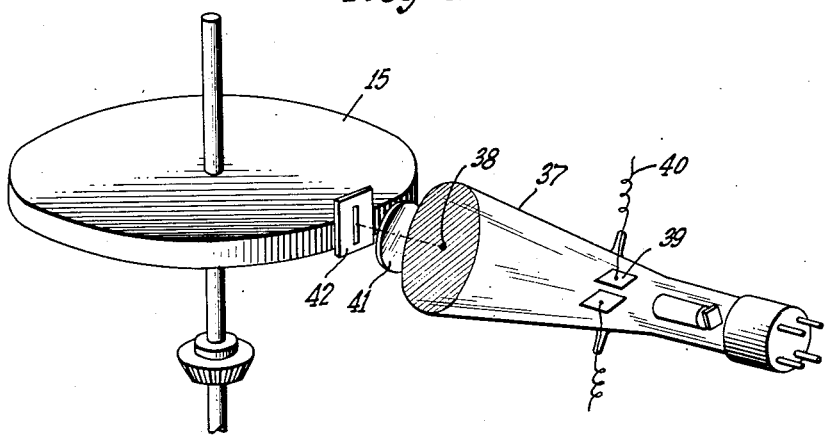
Fig. 4 is a perspective view of portions of a modified arrangement of apparatus for producing an echo effect using a cathode ray tube in accordance with the invention.
Figure 5:
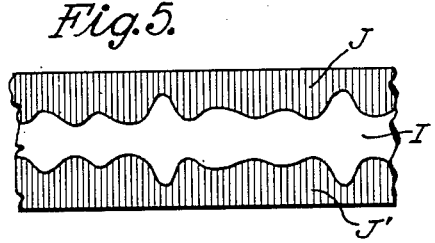
Fig. 5 is an explanatory diagram.

The operation of the echo producing apparatus thus provided is as follows: Original sound signals are picked up by the microphone 10 and passed by way of amplifying stage 11 to the modulating stage 12 where the carrier wave is modulated. Conductor 19 picks up the original sound signal from the amplifier 11 and controls the amplitude of the oscillations of the oscillator 18 in response thereto. In consequence, the brilliance of the light radiated by the mercury vapor lamp 17 varies in response to the sound-generated current supplied by the stage 11 to the modulating stage 12. The optical system is such that as the disc rotates successive elemental areas of an endless band are traversed by the light from the recording device and the image made consists of a series of adjacent fluorescent lines excited by light from the lamp 17; the strength or brilliance of these lines, in consequence, corresponds to the volume or intensity of the controlling sound signal. It is thus seen that a variable density type of sound record is made on the fluorescent surface of the disk 15 when in operation. The fluorescent or ghost image when made is passed after a desired time interval under the mask 25 that is preferably adjusted by means of screw 31 to be precisely over the image of a line element desired to be picked up. The image picked up is focused on the photoelectric cell 28 and the secondary current impulses produced by the traversal of elemental areas of the endless band of the fluorescent surface by the pick-up device are passed into stage 29 and, when amplified, thence by way of conductors 30 to effect, jointly with the current from microphone 10, the modulation of the carrier in the stage 12. When the fluorescent or ghost image passes on to a point under the infra-red source 33 the image is wiped off. An unexcited surface is thereafter passed around to receive a fresh image under the slit of the mask 22. The secondary current supplied from the photoelectric cell 28 thus represents a repeat-sound effect which occurs at a predetermined time interval after the original sound effect, thereby providing means for simulating a simple echo effect.

Where it is desired to produce an echo effect composed of multiple repeat-sounds or reverberations, an arrangement of apparatus such as shown in Fig. 3 may be employed. Here, the microphone, the ordinary sound current amplifying stage, and the modulating stage are shown at 10, 11, and 12, respectively, as in Fig. 1. Here, also, the transient or ghost image of the original sound effect is again made on a fluorescent surface carried on the edge of a constantly rotated disk 15. This image is produced by means of a variable source of ultra violet light, such as the mercury vapor lamp 17, as previously shown, and illuminated by current from an oscillator 18 that is connected to be controlled by the original sound signal through conductor 19 and resistor 20 with the stage 11. The optical system for projecting light from the lamp 17 onto the fluorescent surface may be any suitable system. A system, which is a modification of that shown in Figs. 1 and 2, is depicted and comprises a mask 22a located adjacent the lamp with condensing lenses 22b interposed between the mask and the disk 15 for projecting the image of the slit in the mask on the fluorescent surface. Here also, instead of a single pick-up device being employed, a plurality of such devices are employed and arranged to be affected by the transient or ghost image at different successive instants. Accordingly, a photoelectric cell 28a that is connected to an amplifying stage 29a is provided; the optical system for projecting the light collected may be similar to that associated with lamp 17 and is shown as employing a mask 25a located adjacent to the cell 28a, with lenses interposed between it and the disk 15. Similarly, a second photoelectric cell 28b that is connected to an amplifying stage 29b is provided for picking up the image and causing a repetition of the sound effect at a later instant; there being a suitable optical system such as that already described. The stages 29a and 29b may be separately adjusted but preferably have a common connection through conductor 30c and resistor 20 to pass their currents, for impression jointly with the current from the microphone 10 upon the modulating stage 12. In addition, the conductors 30c and 19 provide a feed-back connection from the amplifiers 29a and 29b through the oscillator 18 to the sound signal-controlled light source 17. The means for erasing the ghost image from the fluorescent surface is shown as a coil 34' disposed to hug a portion of the periphery of disk 15 and supplied with current to induce calorescence and the generation of infra-red rays.

Where it is desired to make a sound image that is of the variable area type instead of the variable density type, an arrangement substituting a cathode ray tube as the source of exciting light may be employed and the amplitude of the oscillation of the cathode ray controlled to represent the original sound effect. An arrangement utilizing a cathode ray tube in this manner is shown in Fig. 4. Here, 15 denotes the disk on the edge of which is disposed the fluorescent material. The cathode ray tube employed is shown at 37, a spot of constant light induced by the impingement of cathode rays being shown at 38 on the screen at the end of the tube. Deflecting means, for example, plates 39, are provided for oscillating the cathode rays in a direction parallel to the axis of disk 15, the plates being connected by way of conductors 40 to a source of oscillating current, such as the oscillator 18, that is under the influence of the original sound effect. An optical system, for example, a lens as shown at 41, is employed to focus the image of the spot 38 when oscillated upon the fluorescent surface, a mask as shown at 42 being preferably interposed for confining the image to a relatively narrow strip of surface. Here, it is seen that, as the amplitude through which the cathode ray is oscillated varies in response to the original sound effects, an image of substantially constant brilliance but of variable width is produced in the fluorescent material on the edge of the disk 15. An example of the character of the image produced is illustrated in Fig. 5. Here, a bright track of variable width representing the image produced is shown at I. Dark areas representing the unexcited fluorescent material bound the track at each side and are shown at J and J'. The light from the image produced is picked up at one or more points by devices of the character already described which respond in effect to the amount of light picked up from across a line element of the image I.

Figure 6:
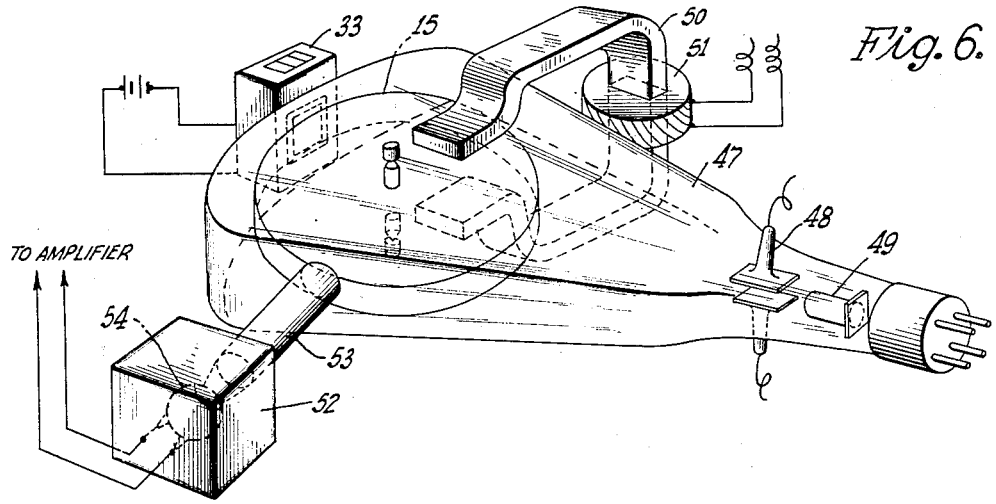
Fig. 6 is a perspective view similar to Fig. 4 and shows another modification using a cathode ray tube for practicing the invention.

Another modification showing an arrangement for obtaining a variable area type image of the sound record is shown in Fig. 6. Here, the disk 15 is enclosed within the envelope 47 of the cathode ray tube, the fluorescent surface being in such case directly impinged by the cathode ray. The tube shown has means at 48 for deflecting the cathode ray vertically and a conventional electrode structure which may include focusing means. The disk 15 is preferably propelled by suitable external means such as an induction means, shown in the drawings as comprising a magnet 50 and exciting winding 51.

The photoelectric pick-up for the image made on the cylindrical surface of disk 15 is also advantageously provided on the exterior of the cathode ray tube. To this end, a housing 52 is shown provided with collimator tube 53 for collecting light from a passing image and projecting it into a photoelectric cell 54, shown in broken lines as within the housing. Image erasing means may also be conveniently disposed on the outside of the cathode ray tube, the erasing means being here illustrated as a lamp housing 33 that has a window giving infra-red light that is projected against the image after it passes the point of pick-up.

Figure 7:
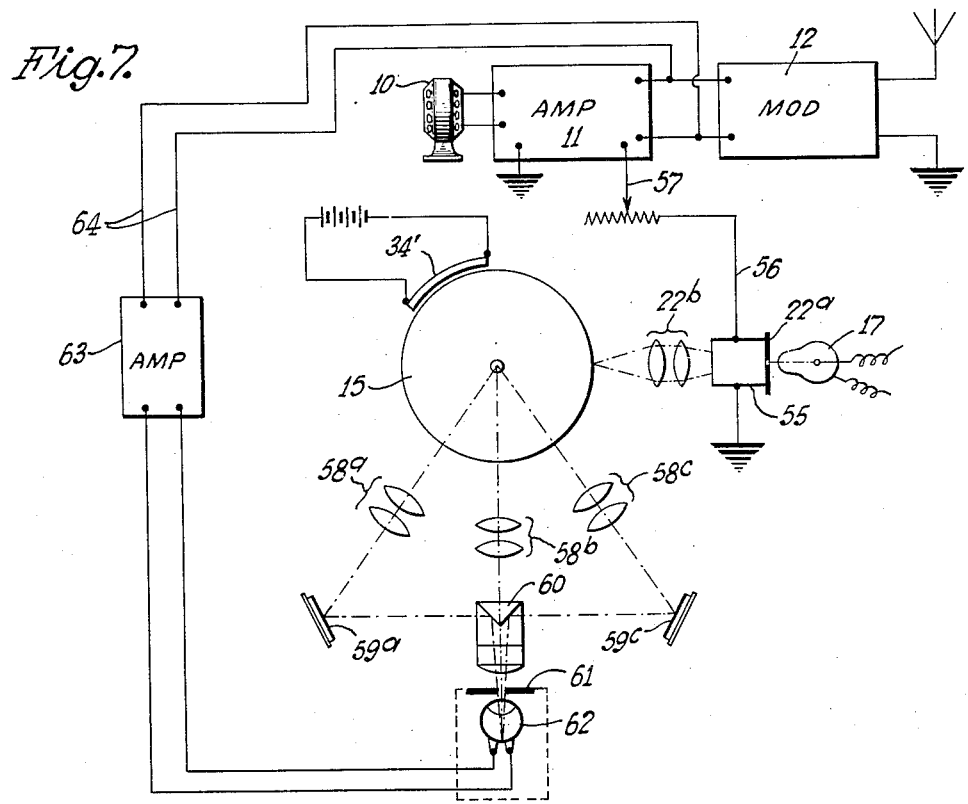
Fig. 7 is a diagrammatic view of still another modification of the invention.

Still another modification of the invention adapted for producing multiple repeat-sound effects and reverberations is shown in Fig. 7. Here, 10, 11, and 12 denote respectively the microphone, amplifying stage, and modulating stage, as heretofore depicted. The rotating disk is shown at 15. A source of ultra violet light is shown as a mercury vapor lamp 17. Here, the light source is of constant intensity, the optical system which focuses the light source upon the fluorescent surface incorporating the light varying means. Such means may be a light valve, for example, a Kerr cell, as shown at 55; the cell being connected to be under the influence of the original sound effects through conductors 56 and 57 that are connected with the amplifying stage 11. The pick-up means for giving a multiple repeat-sound effect comprises a plurality of separate optical systems arranged to collect light from the ghost image at a plurality of different points and project it into a common photoelectric device. This is illustrated by the provision of lens-systems at 58a, 58b, and 58c. Mirrors at 59a and 59c, together with a prism 60, comprise a system that projects the collected light from all three systems through the slit in a mask 61 into a single photoelectric cell 62. This latter has an associated amplifier 63 connected thereto from which lead conductors 64 for supplying the amplified impulses to the input of the modulating stage 12.

In these modified arrangements, it is seen that any number of pick-up devices may be employed at one or more points about the periphery of the disk 15. In consequence, the ghost image may be made to reproduce the original sound effect one or more times at desired instants and with any magnitude, whereby desired echo effects may be simulated whether simple or compound.

Since certain changes in carrying out the above method and in the construction set forth, which embody the invention, may be made without departing from its scope, it is intended that all matter contained in the above description or shown in the accompanying drawings shall be interpreted as illustrative and not in a limiting sense.

The term "fugitive record" as used in the claims refers to a record which tends, of itself, to decay after the recording stimulus is removed, and which disappears of itself within a short time after the stimulus is removed. A record surface adapted to "fugitively retain" records formed thereon is one which will retain the records for a short time but in which the records decay and disappear, of themselves, within a short time after the recording stimulus is removed.

Having described my invention, what I claim as new and desire to secure by Letters Patent is:

1. In the art of sound signalling, the method of producing signals having an echo quality which comprises producing a first signal corresponding to a sound signal, making a fugitive record of said first signal which persists for a substantial period, deriving non-contactually a second signal from said record at a desired instant after said recording, and within said period, and mixing said second signal with said first signal to form a composite signal having an echo quality.

2. In the art of sound signalling, the method of producing signals having an echo quality which comprises producing a first electric sginal corresponding to an original sound signal, making a luminous fugitive record of said first electric signal which persists for a substantial period, deriving non-contactually a second electric signal from said luminous record at a desired instant after said recording and within said period, and mixing said second signal with said first signal to form a composite signal having an echo quality.

3. In the art of sound signalling, the method of producing signals having an echo quality which comprises producing a first electric signal corresponding to a sound signal, making a fluorescent-image record of said first electric signal which persists for a substantial period, deriving a second electric signal from said record at a desired instant after said recording and within said period, and mixing said second signal with said first signal to form a composite signal having an echo quality.

4. In the art of sound signalling, the method of producing signals having an echo quality which comprises producing a first electric signal corresponding to an original sound signal, making a luminous fugitive record of said first electric signal which persists for a substantial period, photoelectrically deriving a plurality of electric signals from said luminous record at desired instants after said recording, and mixing said plurality of signals with said first signal to form a composite signal having an echo quality.

5. In apparatus for producing sound signals having an echo quality, the combination which comprises means for producing a first signal corresponding to a sound signal, a record surface elemental areas of which are adapted to fugitively retain records formed thereon for a substantial period, means for making a fugitive record of said first signal on said record surface, means for non-contactually deriving a second signal corresponding to said first signal from said fugitive record at a desired instant after said recording, and means for mixing said second signal with said first signal to form a composite signal.

6. In apparatus for producing sound signals having an echo quality, the combination which comprises means for producing a first signal corresponding to a sound signal, means for making a fluorescent image record of said first signal, means for deriving a second signal from said record at a desired instant after said recording, and means for mixing said second signal with said first signal to form a composite signal.

7. In apparatus for producing sound signals having an echo quality, the combination which comprises means for producing a first electric signal corresponding to a sound signal, a surface bearing fluorescent material, means for producing a fluorescent image record of said first electric signal on said surface, a photoelectric device disposed adjacent said surface to produce a second electric signal in response to the passage thereby of said fluorescent image record, means for producing relative motion between said record and said photoelectric device, and means for mixing said second electric signal with said first electric signal to form a composite signal.

8. In apparatus for producing sound signals having an echo quality, the combination which comprises means for producing a first electric signal corresponding to an original sound signal, a surface bearing fluorescent material, means for forming a fluorescent image record of an endless band of said first electric signal on said surface, a plurality of photoelectric pick-up devices disposed at spaced points along said endless band to produce a plurality of successive electric signals corresponding to said first electric signal in response to the passage thereby of said fluorescent surface, means for producing relative motion between said pick-up devices and said endless band, and means for mixing said plurality of electric signals with said first signal to form a composite signal.

9. In apparatus for producing sound signals having an echo quality, the combination which comprises means for producing a first electric signal corresponding to an original sound signal, a continuously moving endless surface bearing fluorescent material, means including a light ource for producing a fluorescent image record of said first electric signal, a plurality of optical systems disposed at respectively different points in the direction of movement of said endless surface and adapted to collect light from said fluorescent material, a common photoelectric cell disposed to receive light from said optical systems and produce a second electric signal of complex character, and means for mixing said second electric signal with said first electric signal to form a composite signal.

10. In apparatus for producing sound signals having an echo quality, the combination which comprises a source of light, a continuously rotating disk having a surface bearing fluorescent material, means for producing a first electric signal corresponding to an original sound signal, means for modulating the light of said source in accordance with said first electric signal, an optical system for projecting the light of said source on said material to form a fluorescent image record of said first electric signal, a plurality of pick-up devices so disposed about the periphery of said disk as to be successively excited by said fluorescent image in the course of its passage, and adapted to produce a plurality of electric signals in response to the passage of said image, and means for mixing said plurality of electric signals with said first signal to form a composite signal.

11. In apparatus for producing sound signals having an echo quality, the combination which comprises means for producing a first electric signal corresponding to an original sound signal, a record surface, a recording device for making a record of said first electric signal on said record surface, means for deriving a second signal from said record at a desired instant after said recording, means for feeding back a portion of said second signal to said recording device for recording on said record surface so that further signals may be derived from the record of the signals fed back, and means for mixing said second signal as affected by the portion thereof fed back with said first signal to form a composite signal.

12. In apparatus for producing sound signals having an echo quality, the combination which comprises a source of light, a continuously rotating disk having a surface bearing fluorescent material, means for producing a first electric signal corresponding to an original sound signal, means for modulating the light of said source in accordance with said first electric signal, an optical system for projecting the light of said source on said material to form a fluorescent image record of said first electric signal, a photoelectric device so disposed as to collect light from said fluorescent image during its passage and adapted to produce a second electric signal, means for feeding back a portion of said second signal to said light-modulating means, and means for mixing said second signal as affected by said feedback with said first signal to form a composite signal.

13. In apparatus for producing sound signals having an echo quality, the combination which comprises means for producing a first electric signal corresponding to an original sound signal, a continuously moving endless surface bearing fluorescent material, means for making a fluorescent image record of said first electric signal on said surface, means for deriving a second signal from said record at a desired instant after said recording, means for mixing said second signal with said first signal to form a combined signal, and means for erasing said image record.

14. In apparatus for producing sound signals having an echo quality, the combination which comprises means for producing a first electric signal corresponding to an original sound signal, a source of a cathode ray, means for deflecting said cathode ray at a high frequency, a continuously moving surface bearing fluorescent material, means for modulating said cathode ray in response to said first signal, means including said cathode ray for exciting fluorescence in said material to form a fluorescent image record of said first signal, means for deriving a second signal from said fluorescent image record at a desired instant after recording, and means for mixing said second signal with said first signal to form a composite signal.

15. In apparatus for producing delayed signals, the combination which comprises means for producing a first electric current corresponding to an original signal, a continuously moving surface bearing fluorescent material, means for producing a fluorescent image record of said first electric current on said surface, a photo electric device disposed adjacent said surface to produce a second electric current in response to the passage of said fluorescent image record, at a desired instant after said recording, and means for reproducing said second electric current as a signal.

16. In apparatus for producing delayed signals, the combination which comprises a source of radiations, a continuously moving surface bearing fluorescent material disposed to receive radiations from said source, means for producing a first electric current corresponding to an original signal, means for causing the radiation reaching said surface from said source to vary in accordance with said first electric signal to form a fluorescent image record of said original signal, a photoelectric device disposed adjacent said surface to produce a second electric current in response to the passage of said fluorescent image record at a desired instant after said recording, and means for reproducing said second electric current as a signal.

17. In apparatus for producing delayed signals, the combination which comprises a source of light, a continuously moving surface bearing fluorescent material, disposed to receive light from said source, means for producing a first electric current corresponding to an original signal, means for causing the light reaching said surface from said source to vary in accordance with said first electric signal to form a fluorescent image record of said original signal, a plurality of light-actuated devices disposed adjacent said surface to produce secondary electric currents in response to the passage of said fluorescent image record at desired instants after said recording, and means for reproducing said secondary electric currents as signals.

18. In apparatus for producing a secondary signal from a primary signal, in combination, a record member elemental areas of which are adapted to fugitively retain records formed thereon for a substantial period, means for recording a fugitive record of a primary signal on said record member, and means for non-contactually deriving a secondary signal from said fugitive record within the period in which said fugitive record is retained.

19. In apparatus for deriving delayed secondary electric signals from primary electric signals, in combination, a record member elemental areas of which are adapted to fugitively retain records formed thereon for a substantial period, recording means responsive to a primary electric signal and adapted to record a fugitive record of said primary electric signal on said record member, and means for non-contactually deriving a secondary electric signal corresponding to said primary electric signal from said fugitive record after an interval after said recording and within the period in which said fugitive record is retained.

20. In apparatus for deriving delayed secondary electric signals from primary electric signals, in combination, a luminescent record surface elemental areas of which are adapted to fugitively retain luminous records formed thereon for a substantial period, a recording device responsive to a primary electric signal and adapted to successively record successive portions of said primary electric signal on elemental areas of said luminescent record surface, means for producing a repeated traversal of a substantially endless band of said record surface by said recording device to thereby continuously record a primary signal on elemental areas within said endless band, a pick-up device adapted to derive non-contactually a secondary electric signal corresponding to said primary electric signal from a luminous record thereof on said elemental areas by a traversal thereof, and means for producing a repeated traversal of said endless band by said pick-up device, the traversal of the endless band by the pick-up device being correlated with the traversal by the recording device so that the secondary electric signal is derived after an interval after the recording of the corresponding primary signal.

21. In apparatus for deriving delayed sound electric signals from primary sound electric signals, in combination, a luminescent record surface elemental areas of which are adapted to fugitively retain luminous records formed thereon for a substantial period, a recording device responsive to a primary sound electric signal and adapted to successively record successive portions of said primary sound electric signal on elemental areas of said luminescent record surface, means for producing a repeated traversal of a substantially endless band of said record surface by said recording device to thereby continuously record a primary sound signal on elemental areas within said endless band, a photoelectric pick-up device adapted to derive non-contactually a secondary sound electric signal corresponding to said primary sound electric signal from a luminous record thereof on said elemental areas by a traversal thereof, and means for producing a repeated traversal of said endless band by said pick-up device at substantially the same speed as the traversal thereof by said recording device, the traversal by the pick-up device being delayed with respect to the traversal by the recording device so that the secondary electric signals are derived after an interval after the recording of the corresponding primary electric signals.

22. In apparatus for producing a secondary signal from a primary signal, in combination, a fluorescent record surface adapted to fugitively retain records formed thereon for a substantial period, means for recording a fluorescent record of a primary signal on said fluorescent surface, and means for deriving from said fluorescent record a secondary signal within the period in which said fluorescent record is retained.

23. In apparatus for deriving delayed secondary electric signals from primary electric signals, in combination, a fluorescent record surface adapted to fugitively retain records formed thereon for a substantial period, a recording device responsive to a primary electric signal and adapted to successively record successive portions of said primary electric signal on elemental areas of said fluorescent record surface, means for producing a repeated traversal of a substantially endless band of said record surface by said recording device to thereby continuously record a primary signal on elemental areas within said endless band, a pick-up device adapted to derive a secondary electric signal corresponding to said primary electric signal from a record thereof on said elemental areas by a traversal thereof, and means for producing a repeated traversal of said endless band by said pick-up device, the traversal of the endless band by the pick-up device being correlated with the traversal by the recording device so that the secondary electric signal is derived after an interval after the recording of the corresponding primary signal.

24. In apparatus for deriving delayed sound electric signals from primary sound electric signals, in combination, a fluorescent record surface adapted to fugitively retain records formed thereon for a substantial period, a recording device responsive to a primary sound electric signal and adapted to successively record successive portions of said primary sound electric signal on elemental areas of said fluorescent record surface, means for producing a repeated traversal of a substantially endless band of said record surface by said recording device to thereby continuously record a primary sound signal on elemental areas within said endless band, a pick-up device adapted to derive a secondary sound electric signal corresponding to said primary sound electric signal from a record thereof on said elemental areas by a traversal thereof, and means for producing a repeated traversal of said endless band by said pick-up device at substantially the same speed as the traversal thereof by said recording device, the traversal by the pick-up device being delayed with respect to the traversal by the recording device so that the secondary sound electric signal is derived after an interval after the recording of the corresponding primary sound electric signal.

25. The method of introducing reverberation signals into a primary sound electric signal which comprises continuously recording a fugitive fluorescent image record of said primary sound electric signal, successively deriving a plurality of successively delayed secondary sound electric signals corresponding to said primary sound electric signal from said fugitive fluorescent image record, and combining said primary sound electric signal with the secondary sound electric signals so derived therefrom.

26. In apparatus for deriving delayed secondary electric signals from primary electric signals, in combination, an envelope containing a rotatable element having a fluorescent record surface adapted to fugitively retain records formed thereon for a substantial period and containing means for producing a cathode ray beam which impinges on said fluorescent record surface, means for rotating said rotatable element, means for modulating said cathode ray beam in accordance with a primary electric signal to thereby produce a fluorescent record thereof on said fluorescent record surface when the said element is rotated, and a pick-up device responsive to said fluorescent record for deriving therefrom a secondary electric signal corresponding to said primary signal within the period in which said fluorescent record is retained, said pick-up device being positioned to derive said secondary electric signal from the fluorescent record of the corresponding primary signal at an interval after the recording of the primary signal.

27. In apparatus for deriving delayed sound electric signals from primary sound electric signals, in combination, an envelope containing a rotatable element having thereon a substantially endless band of fluorescent material adapted to fugitively retain records formed thereon for a substantial period and containing means for producing a cathode ray beam which directly impinges on said endless band of fluorescent material, means for rotating said rotatable element at substantially uniform speed, means for modulating said cathode ray beam in accordance with a primary sound electric signal to thereby produce a correspondingly modulated fluorescent record thereof on said band when said element is rotated, and a photoelectric pick-up device responsive to said fluorescent record for deriving therefrom a secondary sound electric signal corresponding to said primary sound electric signal within the period in which said fluorescent record is retained, said photoelectric pick-up device being positioned so that the point of pick-up is at a distance along said fluorescent band from the point of recording whereby the pick-up device derives a secondary sound electric signal from the fluorescent record of the corresponding primary signal at an interval after the recording of the primary signal.

PETER C. GOLDMARK.